United States Patent
Thierer et al.

(10) Patent No.: US 7,742,970 B2
(45) Date of Patent: Jun. 22, 2010

(54) RESTRICTED PARTY SCREENING

(75) Inventors: Jochen Thierer, Naherweg (DE); Torsten Zube, Helmstadt-Bargen (DE)

(73) Assignee: SAP Aktiengesellschaft, Walldorf (DE)

( * ) Notice: Subject to any disclaimer, the term of this patent is extended or adjusted under 35 U.S.C. 154(b) by 524 days.

(21) Appl. No.: 10/327,689

(22) Filed: Dec. 20, 2002

(65) Prior Publication Data
US 2004/0122761 A1 Jun. 24, 2004

(51) Int. Cl.
*G06Q 40/00* (2006.01)
(52) U.S. Cl. .......................... 705/37; 705/38
(58) Field of Classification Search .............. 705/36, 705/44, 37–38, 76; 707/37, 7, 6
See application file for complete search history.

(56) References Cited
U.S. PATENT DOCUMENTS

| | | | |
|---|---|---|---|
| 4,833,610 A | 5/1989 | Zamora et al. | |
| 5,659,731 A | 8/1997 | Gustafson | |
| 5,724,597 A | 3/1998 | Cuthbertson et al. | |
| 5,799,267 A | 8/1998 | Siegel | |
| 5,930,768 A * | 7/1999 | Hooban | 705/27 |
| 5,956,711 A * | 9/1999 | Sullivan et al. | 707/6 |
| 5,970,475 A * | 10/1999 | Barnes et al. | 705/27 |
| 5,978,780 A * | 11/1999 | Watson | 705/40 |
| 5,999,937 A | 12/1999 | Ellard | |
| 6,032,133 A * | 2/2000 | Hilt et al. | 705/40 |
| 6,058,379 A * | 5/2000 | Odom et al. | 705/37 |
| 6,438,539 B1 | 8/2002 | Korolev et al. | |
| 6,629,081 B1* | 9/2003 | Cornelius et al. | 705/30 |
| 6,728,706 B2* | 4/2004 | Aggarwal et al. | 707/5 |
| 6,983,288 B1* | 1/2006 | Kirkwood et al. | 707/103 R |
| 2002/0040359 A1* | 4/2002 | Green et al. | 707/3 |
| 2002/0055867 A1* | 5/2002 | Putnam et al. | 705/8 |
| 2004/0078316 A1* | 4/2004 | Clark et al. | 705/37 |
| 2004/0088283 A1* | 5/2004 | Lissar et al. | 707/3 |

OTHER PUBLICATIONS mkuhn@rhlab.UUCP (Michael Kuhn), *Phonetic Search Coders*, Nov. 29, 1995, 15 pages.
Lawrence Philips, *Metaphone Algorithm*, 2 pages.
Lawrence Philips, *The Double Metaphone Search Algorithm*, 8 pages.

* cited by examiner

*Primary Examiner*—Thu Thao Havan
(74) *Attorney, Agent, or Firm*—Fish & Richardson P.C.

(57) ABSTRACT

Regulating trade activities comprises receiving information identifying a potential trading party, normalizing at least a portion of the received identifying information to generate a normalized identifier for the potential trading party, comparing the normalized identifier with one or more other normalized identifiers corresponding to parties with whom trade should be restricted, and selectively restricting trading with the potential trading party.

29 Claims, 4 Drawing Sheets

RESTRICTED PARTY SCREENING

BACKGROUND

The following description relates to identification of trading parties, such as customers, suppliers, shippers, and carriers, that may appear on one or more lists of parties with whom a company should not, for various reasons (e.g., restriction treatises, laws, or regulations) conduct business.

Businesses face increasing pressure to provide products to their customers as quickly as possible for the lowest possible cost. For companies that ship products on a very large scale, it can become very difficult to manage and track inventory that is in-transit. International trade brings about even greater pressures and complexities. For example, the transactions may have to be conducted in multiple languages, with multiple currencies, while complying with multiple sets of laws. Cross-border transactions also generally require customs clearance, and each cross-border transaction can often involve many different parties.

Various countries also publish, by legislation or regulation, lists of individuals or organizations with which trade may not be legally conducted. These regulations put increased legal responsibilities on parties delivering and receiving products both within a country and across national borders, to know the identities of the parties with whom they are dealing. Failure to comply with a country's requirements could result in penalties and fines, and could possibly bar a company from further trade. Sanctions may also include the denial to a party of the benefit of export licenses, loans, government bonds, or funds. They may also include the restriction of services, such as assistance in the import or export of goods, or the sale of goods to a particular government.

SUMMARY

This document discloses a method and system that assists in identifying parties with whom trade relations should be restricted, by providing for the matching of prospective trade partners to a list of denied parties, whether as a literal match or a non-literal (fuzzy) match. In one aspect, a computer-implemented method of regulating trading activities is provided. The method comprises receiving information identifying a potential trading party, normalizing at least a portion of the received identifying information to generate a normalized identifier for the potential trading party, comparing the normalized identifier with one or more other normalized identifiers corresponding to parties with whom trade should be restricted, and electively restricting trading with the potential trading party. The identifying information may comprise a name or address of the potential trading party, and may be received from a remote business application server. The information may also be obtained from a business workflow, and by a plug-in module to an enterprise customer resource management system, such as by the result of a change in the master data of the system or the result of a shipping event. Also, all of the identifying information may be normalized. The normalizing may include conversion according to phonetic rules, conversion according to predetermined synonyms, and conversion from an unabbreviated form to an abbreviated form.

In some applications, a first plurality of identifiers for parties with whom trade should be restricted may be converted so as to form the one or more normalized identifiers corresponding to parties with whom trade should be restricted (which may be normalized before the identifying information for the potential trading party is received). A second plurality of identifiers for parties with whom trade should be restricted may be converted to create normalized identifiers, and the normalized identifiers may be added to the one or more normalized identifiers corresponding to parties with whom trade should be restricted.

A match signal may also be generated if the normalized identifier for the potential trading party matches one of the normalized identifiers corresponding to parties with whom trade should be restricted. The signal may identify whether trade should not be conducted with a potential trading party, and may cause a transaction with the potential trading party to be denied. The identifier may be received from a user at a web browser, and the user may be notified upon requesting an order that the transaction has been denied. Also, the selectively restricting may comprise prohibiting trade with the potential trading party if the normalized identifier matches one or more of the other normalized identifiers.

A denied party identification system is also identified, and comprises a proposed trading party monitor module in communication with an enterprise resource planning system. A party identification normalizer receives party identification information from the monitor module, converts it to a normalized format, and compares it to restricted party identification information that is in a normalized format. A party match generator notifies the enterprise resource planning system if the party identification information matches any restricted party identification information. The monitor may be a plug-in module that resides on the same server as a part of the enterprise resource planning system, may monitor workflow transactions of the enterprise resource planning system, and may obtain party name and address information from workflow transactions. The normalizer may receive restricted party information and convert it to a normalized format, and the monitor module may provide party identification information to the party identification normalizer in real-time or near real-time, or in batch submissions.

In another aspect, a method of regulating trading activities comprises monitoring transactions in an enterprise resource planning system for party identifying information of a potential trading party, comparing an identifier corresponding to the party identifying information to one or more identifiers corresponding to parties with whom trade is restricted, and selectively restricting trading with the potential trading party if the identifier corresponding to the party identifying information correlates with one of the identifiers corresponding to parties with whom trade is restricted.

The systems and techniques described here may provide one or more of the following advantages. A system may provide effective and automated checking for parties with which business should not be conducted, without requiring a literal match, and may provide for manual review of any adverse decisions. Such a system may allow for checking without interrupting the normal business flow of a transaction, so that appreciable modification of business practices will not be needed in order to comply with restricted party laws.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to identifying, from among the various parties with whom an organization conducts commerce, which of those parties appears on one or more restricted parties lists.

Figure 1:
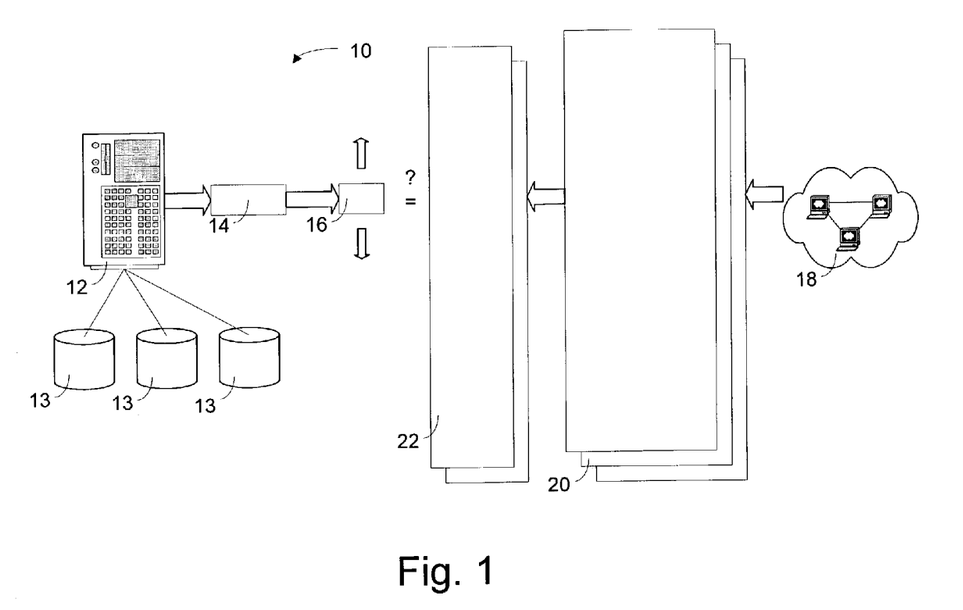
FIG. 1 is a block diagram of a monitoring system for identifying trading parties that match parties with which one is not to conduct business.

FIG. 1 is a block diagram of a monitoring system 10 for identifying potential trading parties that match parties with which one is not to conduct business. The system 10 may provide for identification when the name of the potential trading party is not an exact, literal match for a party that is on a list of restricted parties. For example, the system 10 may accommodate misspellings, typing errors, aliases, phonetic differences, and other differences that can make one description of a person or entity different from another description of that same person or entity. In this manner, system 10 can provide for monitoring with fuzzy matching capability.

Enterprise resource planning system 12 provides various business services for an organization, such as supplier relationship management, customer relationship management, and other various services. Enterprise resource planning system 12 may be associated with a variety of databases 13 that can store both formatted data (such as in the form of a flat file or relational database) and unformatted data (such as in the form of a word processing document or web page). Enterprise resource planning system 12 may be used to manage processes by which an organization organizes its sales and shipping operations. For example, enterprise resource planning system 12 can maintain information about the organization's product offerings and inventory of those offerings, may receive information relating to orders by customers of the organization, may generate invoices and shipping records for the orders, and may track the shipment of the products.

Identification information 14 may be obtained from enterprise resource planning system 12 regarding trading parties with which the organization interacts. These parties can include entities (either individuals or organizations) with which the organization conducts direct trade, such as suppliers and customers. The trading parties may also include other parties with which an organization does business either directly or indirectly, such as financial institutions, carriers (e.g., shipping and trucking companies), shippers (i.e., parties sending and receiving goods), freight forwarders, and other individuals or organizations.

Identification information 14 may be extracted from enterprise resource planning system 12. Identification information 14 can take the general form of shipping information, such as a name and corresponding address of a target entity (i.e., an entity with which the organization may conduct business in the future). The party that corresponds to the information may be an individual or an organization. The identification information 14 may be accessed at various points in the operation of enterprise resource planning system 12. For example, when a monitoring system 10 is first established, all of the identification information that is then in the enterprise resource planning system 12 may be reviewed. This information may be located, for example, in a "master data" portion of the system's database. This master data may include general information that is used repeatedly by the system, such as information about various parties, including addresses, company code information, sales information, and marketing data. In addition, the information 14 may be accessed each time a party is added to the master data, or the information for a party is changed in the master data. The information may also be accessed in batches, such as to reduce the number of accesses required and thereby lower the load on the system 10. The information 14 may also be accessed at specific points in the processing of enterprise resource planning system 12, such as when an order is received, an invoice is produced, or a product is set to be shipped.

After the information has been accessed, it may be copied and converted into normalized target information 16. The conversion process may, for example, follow a number of conversions that reduce the information to a lowest common denominator so as to reduce the variability among various pieces of information. In this manner, minor differences between two identifiers can be eliminated so that two different identifiers that represent the same party will be made to match each other. For example, as described in more detail below, words that appear in the information may be converted to common forms (such as by converting "Corp.," "Inc.," "Incorporated," "LLP," "PC," and "GmbH" to "CORP.").

The normalized target information 16 may then be compared against normalized sets 22 of information for parties that are listed in one or more restricted parties sets 20 that correspond to a restricted party list. The restricted party sets 20 may comprise identifying information, such as names (and aliases) and addresses, for various parties. The sets 20 may be derived from information released by various governments, and could also include information regarding parties with which an organization does not care to conduct business, such as parties that have previously failed to pay their bills to the organization. The sets 20 may be formatted in any appropriate manner, such as by database entries having appropriate database fields, or as an XML document or other type of document.

As shown, the sets 20 may be accessed via a network 18, such as the Internet. The sets may come directly from the organization, can be obtained from third-party service providers that format the information, or can be obtained or generated by other means. Also, various sets 20 may be maintained separately or may also be merged into a single set, or multiple groups of sets. In addition, full sets may be initially accessed, and thereafter, only changes to the sets may be provided as part of an updating process. In this manner, updating may occur frequently without the need to transfer large amounts of data each time. The updating may occur as part of a "push" of data from the information provider, or by the system 10 requesting the new information, such as by a user of system 10 selecting the information from a web browser or by the system 10 periodically accessing the information, such as at a predetermined time each day, or each time of the day, the system is restarted.

A comparison of normalized party information 16 to the appropriate normalized sets 22 can provide an indication that the particular party is an entity with whom an organization should not conduct business. To conduct the comparison, the sets 22 may be searched using the normalized party information 16 as a search key. The search may be conducted using any of a variety of appropriate searching methods. Also, the criteria for identifying a match may be varied, so that an organization may fine-tune system 10 to its particular needs. For example, a match may be generated if two normalized string have a partial string identity (e.g., in percent). Also, the degree of similarity between the original strings may be combined with the degree of similarity between the normalized strings to create a composite score. Also, various forms of identifying information for a party, such as name, street, city, region, country, and telephone number, may be analyzed in parallel, and the composite level of similarity among those various factors can be determined, whereby different weightings may be given to different factors, in reaching the composite score. In this manner, the customer can be provided with the ability to customize a system in multiple ways. Also, portions of normalized strings may be compared, or only portions of original strings may be provided to the normalizing process.

Figure 2:
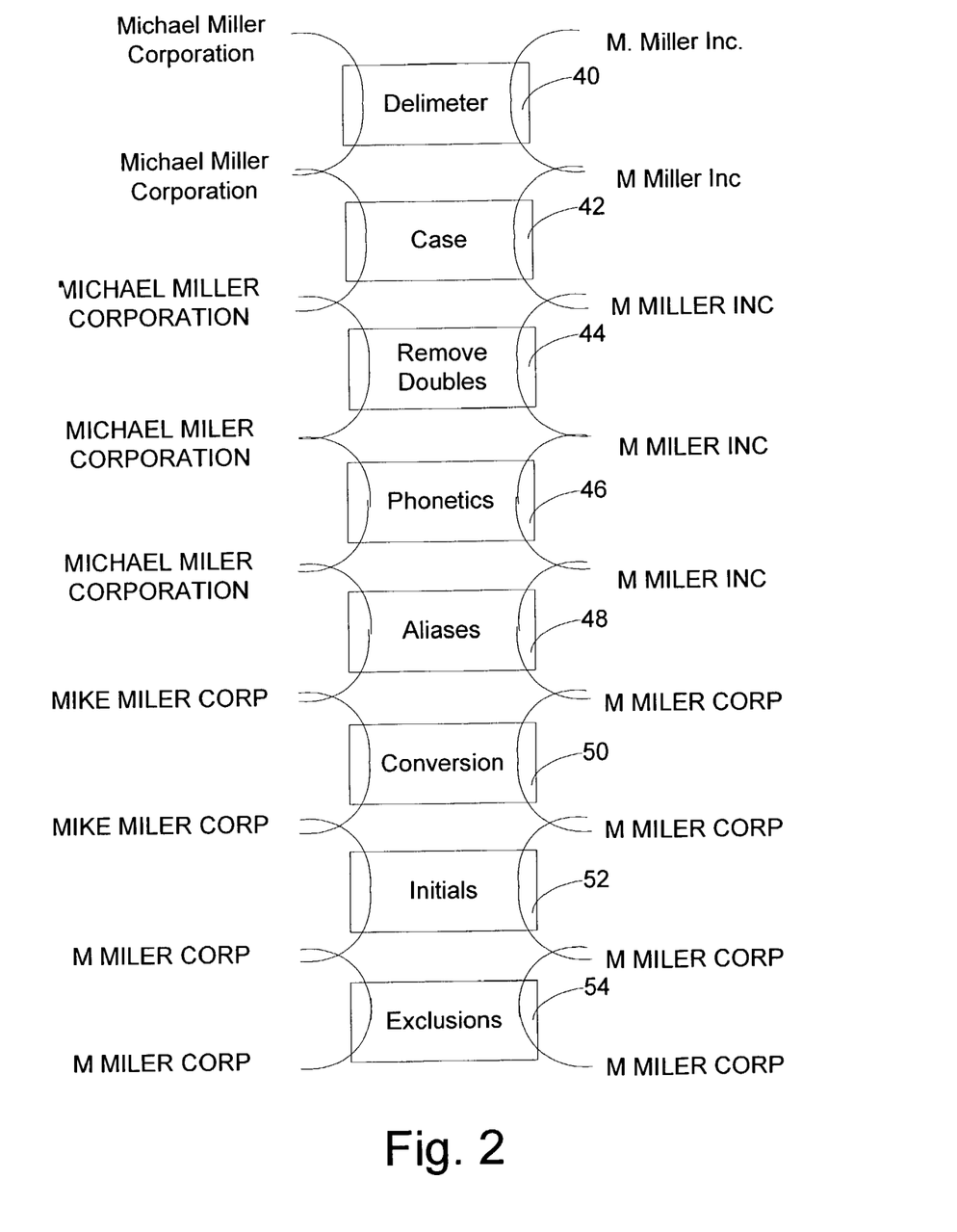
FIG. 2 is a flow diagram of a name conversion between the name of a potential trading party and a name on an restricted party list.

FIG. 2 is a flow diagram of a name conversion between the name of a potential trading party and a name on an restricted party list. In general, the name of a party that has been provided to an organization's computer system, such as by an on-line order for a product, is shown down the left edge of the figure. The name of a party that appears on an restricted party list appears on the right edge of the figure. The names are literally different, but are very similar, and could represent the same entity. Although the figure shows the conversion process of both names in parallel, in a more likely scenario, the name on the restricted party list would be converted first and stored in its normalized state, the name of the target would then be converted, and the two converted names would be compared.

At box 40, delimiters or punctuations are removed from the names. Alternatively, various delimiters could be converted to other delimiters. For example, front slashes ("/") could be converted to back slashes ("\") and commas could be converted to periods. At box 42, the case is changed, so that all letters are in upper case. This step helps ensure consistency where the proper case is not always certain or agreed upon. At box 44, doubles are removed. In this manner, additional typographical problems, whether inadvertent or intentional, may be eliminated.

Phonetics may be converted at box 46 so as to provide a certain degree of "sound alike" matching between the entities. Various phonetic rules may be used, and the rules may be absolute or conditional. For example, the letters "ph" may always be converted to "f," while the letters "ou" may be converted to "ow" in only certain situations.

Aliases may be assigned at box 48. For example, well-known aliases may all be converted to a single common alias, such as by converting "Corporation," "Incorporated," "Inc.," "LLP," and "GmbH" to "Corp". Other aliases may also be accomodated, and the system may allow for the addition of further alias conversion rules. A further conversion may occur at box 50. For example, "Mueller" may be converted to "Müller." In FIG. 2, none of the conversion rules for box 50 applied to either string of information. At box 52, the system may also convert certain names to initials, such as first names for individuals or organizations. At box 54, the system may make exclusions. For example, certain terms that might generate false misses if they are present, but will not likely generate false hits if they are removed, can be eliminated. One example could be corporate identifiers, such as "Inc." and "Corp." (Their removal would take away the need to convert them to an alias.)

The conversions shown in FIG. 2 are provided as examples, and other conversions or groups of conversion could be made. For example, a spell checker could review the entries and provide for automatic correction of obvious errors. In addition, not all of the conversions shown would need to be made. Moreover, certain conversions could be avoided depending on the results of earlier conversions. Other conversions may also be eliminated if the matching algorithm does not require a literal match. For example, the "case" step may be eliminated if the matching algorithm is not case sensitive. Also, rather than converting a single string, the system could convert subsets of inputted strings, or could create additional strings at certain points in the process. For example, the string "Jack Smith" may be used to produce the strings "John Smith" and "Jack Smith," which may then both be used in the comparison.

The conversion and comparison process may also be configured to provide greater or lesser conversion (or tighter or looser comparison) based on the needs of the organization. For example, if too many "false hits" are being generated, the process may be adjusted so that party identifiers are not converted as much (i.e., it would reduce the granularity of the conversion and comparison). To change the granularity of the matching process, various different rule sets may be established, some of which provide more extensive conversion than others, so that the former are more likely to establish a match. Rule sets may be provided, for example, by third parties. In addition, various different identifiers or groups of identifiers (such as name, address, and country) may be chosen for comparison. In addition, certain comparisons may be conditional, so that different rules may be applied depending on the value of one of the identifiers. Also, various rules within a conversion set may be turned on or off, so that a wide variety of conversion sets having a variety of granularity may be selectively formed. Moreover, the conversion rules may be stored in a manner that permits for easy editing, such as in comma or tab-delineated text files or XML files, so that an organization can change the rules as the need exists. Also, an interface program for assisting with the establishment and editing of conversion rules may also be provided.

In addition, the degree of relatedness between the two strings may also be indicated by the system. For example, the target identifier may be compared to the restricted party list (whether in a non-converted, partially converted, or fully converted form) at multiple points during the conversion process. A match higher up in the conversion process would indicate a greater degree of relatedness between the two strings. From this comparison process, a factor indicating the degree of relatedness may be generated. Such a factor may be used, for example, by a operator who is tasked with manually reviewing any matches identified by the system, or in generating a work flow process based on the degree of relatedness.

The conversion and comparison process may also be configured to handle multiple different languages. In such a situation, different conversion rules or sets of conversion rules may be associated with a particular language. The system may then use a conversion rule set that corresponds to the organization's native language, or to the language of its greatest number of commerce partners. Also, identifiers for particular parties may be subjected to one set of conversion rules or another based on the address or telephone number of the party, or on certain other recognizable features of the party's identifiers, such as particular characters or groups of letters.

Figure 3:
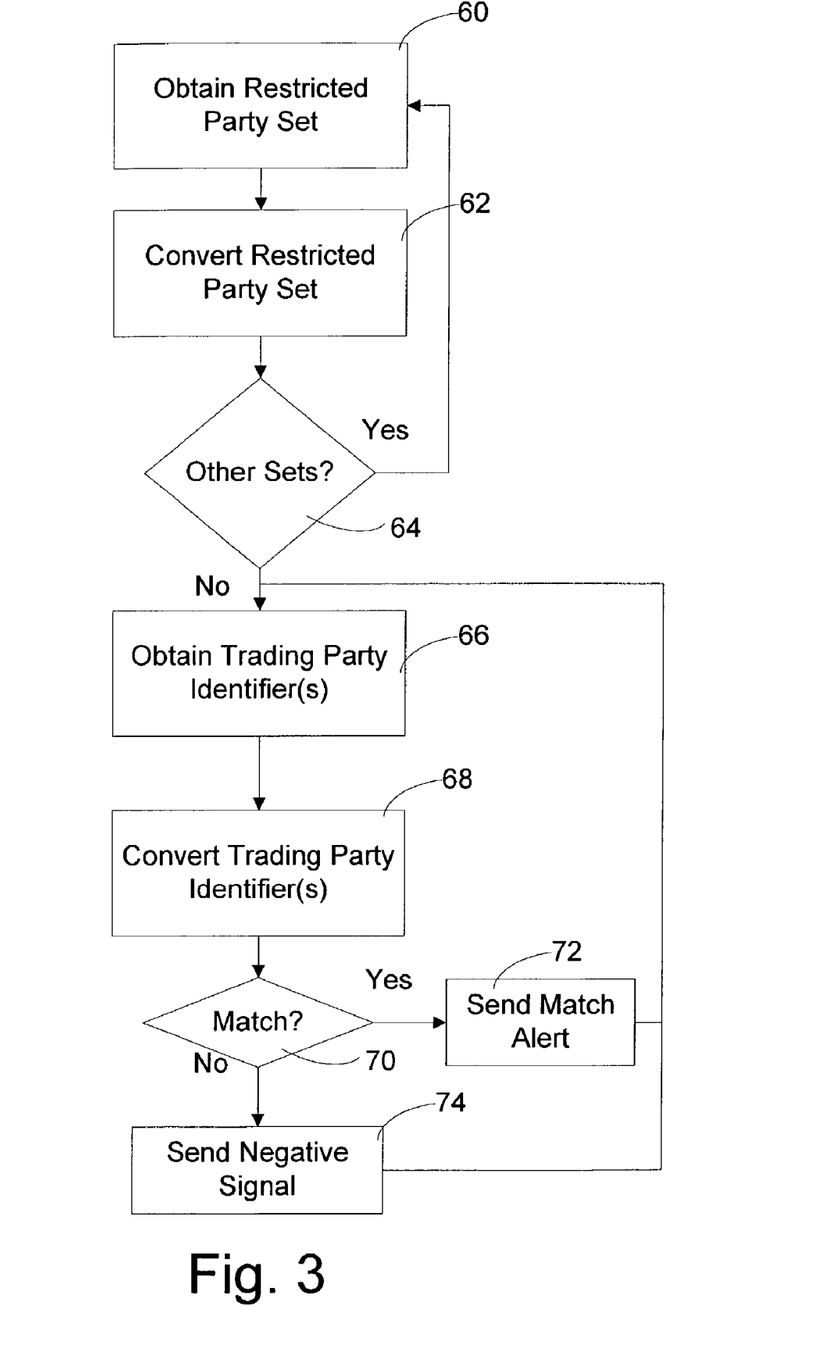
FIG. 3 is a flowchart of a process for checking a potential trading party against a restricted party list.

FIG. 3 is a flowchart of a process for checking a potential trading party against an restricted party list. At box 60, a restricted party set may be obtained, such as from a government agency or from a third-party service provider. Other sets may be obtained from other sources, and the sets may be stored separately or may be combined. For example, where the sets apply to different countries, they can be kept separate, and the appropriate set may be selected for comparison based on the address of a party or the shipping addresses of a product. At box 62, the restricted party set is normalized, such as by using a conversion process like that shown in FIG. 2. If other sets require conversion, as indicated by box 64, they also may be converted. Also, if additional entries are to be added to a set, they can also be converted.

At an appropriate time, an identifier for a possible trading party may be supplied to the system, as shown at box 66. That identifier may be converted at box 68, and may be compared against one or more restricted party sets, as shown by box 70. If there is no match, the system may generate a negative signal, which may then be provided to the application that provided the identifier for the possible trading partner, or to another application (box 74). If there is a match, a match signal may be generated and provided. Also, when there is a match, further comparisons may be conducted using other conversion rules, or using a subset of the conversion rules that were previously used. The results of these further comparisons may be used to override a false match signal (so that a negative signal is sent) or may produce a factor that indicates the degree of relatedness (so that a match signal and the factor are sent).

Figure 4:
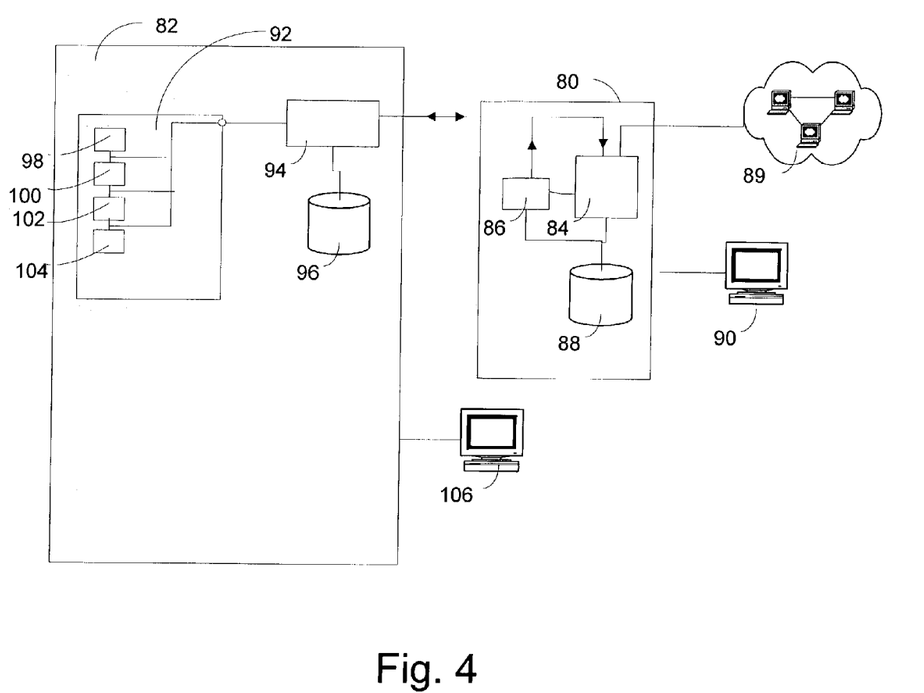
FIG. 4 is a block diagram showing components of a system for identifying matches between potential trading parties and a restricted party list.

FIG. 4 is a block diagram showing components of a system for identifying matches between potential trading parties and a restricted party set. Monitoring system 80 is connected to another information system 82, such as over a local area network (LAN). Information system 82 may represent an enterprise resource planning (ERP) system that resides on one or more computers, such as servers, in an organization. Monitoring system 80 may be configured to run on a dedicated computer or may be integrated with information system 82. In one example, monitoring system 80 may be provided as an add-on component to an existing system, and may provide plug-in module 94 to permit communications with the existing information system 82. Plug-in module 94 may be provided with a number of interfaces so as to permit monitoring system 80 to work with a number of different systems by different manufacturers.

Plug-in module 94 provides for the capturing and transmission of information to monitoring system 80 that is needed to allow monitoring system 80 to operate. For example, plug-in module 94 may communicate with application 92, which may be, for example, a sales processing application for an organization. Plug-in module 94 may also communicate with database 96, which may be one or more databases that store information related to various business operations, such as information on orders and customers. Plug-in module may communicate using protocols that are native to the application 92. For example, in one system, synchronous communication may take place using a remote function call (RFC), which may be used with an SAP R/3 system. Likewise, asynchronous communication may use application link enabling (ALE) with an Idoc interface. Plug-in module 94 may be any combination of hardware, firmware, and software, and may include appropriate elements to allow such communication, including by programs, function modules, transactions, and database tables.

Plug-in module 94 may access information that identifies potential trading parties in various ways. For example, plug-in module may receive a signal that indicates certain party information has been changed in the system (such as through the addition of a new party or the editing of an existing party), and may access the information so that it may be checked or re-checked against the restricted party lists to which monitoring system 80 has access.

Plug-in module 94 may also monitor business flows and access identifier information during the flow, such as in situations where a party is only temporarily referenced by the system, and is not added to a central repository of parties. Such a situation may occur, for example, when a freight company is identified as being related to a single sales transaction, and there is no reason for information system 82 to maintain a permanent record of the party.

Box 98 represents an order by a potential customer in a computer system. For example, information about a potential customer can be received when the potential buyer clicks on a "BUY" button in a web browser. The sale may be processed by information system 82 in any appropriate manner. The information system 82 may generate a signal obtain receiving the information, and this signal can be observed by plug-in module 94 so that plug-in module 94 may obtain the new identifier information.

The accessing and monitoring of such information may occur in real-time or on a delayed basis. For real-time comparison, plug-in module 94 may immediately provide identifying information to monitoring system 80, and may receive an immediate response. For example, where a potential customer is ordering a product from a web site and is awaiting immediate on-screen confirmation of the order, real-time processing may be preferred. Alternatively, multiple transactions (whether from a business process or from a master database) may be compiled and then processed as a group when immediate processing is not required. Such batch processing may provide the advantage of reducing the flow of information between plug-in module 94 and monitoring system 80, and may allow monitoring system 80 to convert and match identifiers more quickly. Such benefits may be particularly helpful when a high volume of transactions is being handled by information system 82 and being checked by monitoring system 80.

Plug-in module 94 may also send signals to information system 82 so as to prevent the organization from conducting business with a party on a restricted party list. Thus, where monitoring system 80 is able to follow the business flow of information system 82 and respond with adequate speed, further processing of a transaction and further interaction with a restricted party may be avoided with limited disruption to an organization's ordinary work flow.

Box 100 represents an invoicing event in a workflow process. Again, the identifier information to be applied to the invoice may be checked by monitoring system 80. Box 102 represents a shipping event, such as the generation of a shipping label in preparation for sending a product. The identifier may be checked again at this point. Such a check may be useful in case new parties have been added to the restricted party list since the previous check. To reduce the burden of such subsequent searches on monitoring system 80, information may be provided to monitoring system so that it only conducts comparisons with parties added after the previous check on the potential trading party.

Box 104 represents an end shipping event, such as completed delivery (e.g., as indicated by a successful delivery signal provided by a carrier, such as via the Internet). A final check may be conducted upon the occurrence of this event. In addition, periodic checks may be conducted on all transactions that have shipping in-progress, so as to provide matches to any parties added to an excluded party list to permit recall of the shipment before it is delivered.

Monitoring system 80 may contain a conversion and comparison module 84 that receives identifier information from plug-in module 94, and conducts a conversion and comparison process like that described earlier. Conversion and comparison module may also be in communication with network 89, such as the Internet, to obtain information relating to restricted party lists. Monitoring system 80 may also include database 88 to store information such as the converted sets of information for the restricted party lists. In addition, database 88 may store information relating to the operation of conversion and comparison module 84, such as the information concerning potential trading partners that generated a match with a restricted party.

Feedback module 86 may generate signals that indicate to plug-in module 94 and information system 82 the results of the comparison. In response, for example, information system 82 may be configured to place a "block" indicator on any transaction or party that has generated a match, and store the indication with the party or transaction in database 96. Feedback module 86 may generate its signals in response to information that it receives from conversion and comparison module 84, or from database 88.

The operation of monitoring system 80 (and the results of that operation) may be reviewed and controlled by users at station 90 or station 106. Station 90 may be provided as an interface to monitoring system 80, such as by providing a monitor and input devices to a server on which monitoring system is implemented.

Station 90 may provide a wide range of functionality. For example, station 90 may provide alerts when monitoring system 80 has indicated a match, so that a user may manually review a transaction and override the decision of monitoring system 80. In such a situation, feedback module 86 may be blocked from generating a match signal until after manual review has occurred, or feedback module 86 may send an immediate match signal and may later send a negative signal that overrides the original signal after manual intervention has occurred. In addition, actions by the user may start an automated workflow process, such as when a transaction cannot be cleared without approval of a supervisor, or when a supervisor wants to receive an indication of every match that has been overridden.

Reporting capabilities may also be provided through station 90. For example, monitoring system 80 may keep a log of matches or transactions that were close to matching, and the log may be accessed and analyzed from station 90. The log may permit an audit trail to be formed and stored, so that an organization may review what matches have been overridden and by whom. For example, a user may access reports that show a list of blocked business transactions (e.g., orders, deliveries, purchase orders); a list of blocked business partners (e.g., customers, vendors); a list of business transactions and business partners that still need to be screened; a list of released business transactions and business partners; audit trails of already executed screenings for business transactions and business partners; a list of all entries contained in the system that have passed through the screening process; a list of such entries about to expire; and a list of screening-related entries that have been added. Station 106 may be provided in communication with information system 82 to provide access to information generated by monitoring system 80. In general, station 106 may provide functionality that is similar to that provided by station 90. Station 106 may also be able to provide additional functionality due to its direct connection to information system 82. For example, station 90 may allow for the analysis of data relating to parties that have been granted or denied trade, using tools that are available as part of information system 82.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used to manage collaboration sessions. The logic flows depicted in the figures do not require the particular order shown, or sequential order, to achieve desirable results. Other embodiments may be within the scope of the following claims.

What is claimed is:

1. A computer-implemented method of regulating trading activities, the method comprising:
receiving information identifying a potential trading party;
normalizing, with a computer system, at least a portion of the received identifying information to generate a normalized identifier for the potential trading party;
using the computer system to compare the normalized identifier with one or more other normalized identifiers corresponding to parties with whom trade should be restricted; and
selectively restricting trading with the potential trading party using, at least in part, the computer system.

2. The method of claim 1, wherein the normalizing comprises conversion according to phonetic rules.

3. The method of claim 1, wherein the normalizing comprises conversion according to predetermined synonyms.

4. The method of claim 1, wherein the normalizing comprises conversion from an unabbreviated form to an abbreviated form.

5. The method of claim 1, further comprising converting a first plurality of identifiers for parties with whom trade should be restricted, to the one or more normalized identifiers corresponding to parties with whom trade should be restricted.

6. The method of claim 5, wherein the plurality of identifiers for parties with whom trade should be restricted are all normalized before the identifying information for the potential trading party is received.

7. The method of claim 6, further comprising converting a second plurality of identifiers for parties with whom trade should be restricted to create normalized identifiers, and adding the normalized identifiers to the one or more normalized identifiers corresponding to parties with whom trade should be restricted.

8. The method of claim 1, further comprising generating a match signal if the normalized identifier for the potential trading party matches one of the normalized identifiers corresponding to parties with whom trade should be restricted.

9. The method of claim 8, wherein the match signal identifies whether trade should not be conducted with a potential trading party.

10. The method of claim 9, wherein the match signal causes a transaction with the potential trading party to be denied.

11. The method of claim 10, wherein the identifier is received from a user at a web browser, and the user is notified upon requesting an order that the transaction has been denied.

12. The method of claim 1, wherein selectively restricting comprises prohibiting trade with the potential trading party if the normalized identifier matches one or more of the other normalized identifiers.

13. The computer-implemented method of claim 1,
wherein the information identifying a potential trading party is received from the potential trading party as part of a process in which the potential trading party seeks to obtain goods or services from a supplier of the goods or services;
wherein normalizing at least a portion of the received identifying information comprises transforming the identifying information in a manner similar to a manner in which the normalized identifiers corresponding to parties with whom trade should be restricted have been transformed, so as to make more likely a match between the received identifying information and the normalized identifiers corresponding to parties with whom trade should be restricted;
wherein trading with the potential trading partner occurs upon a determination that the received normalized identifier matches one or more of the normalized identifiers corresponding to parties with whom trade should be restricted; and
wherein selectively restricting trading comprises interfering with a transaction between the potential trading party and the supplier of goods or services.

14. The method of claim 13, wherein the identifying information comprises a name of the potential trading party.

15. The method of claim 13, wherein the identifying information comprises address information of the potential trading party.

16. The method of claim 13, wherein the identifying information is received from a remote business application server.

17. The method of claim 13, further comprising obtaining the identifying information from a business workflow.

18. The method of claim 13, wherein the identifying information is obtained by a plug-in module to an enterprise customer resource management system.

19. The method of claim 18, wherein the identifying information is obtained as the result of a change in the master data of the system.

20. The method of claim 18, wherein the identifying information is obtained as the result of a shipping event.

21. The method of claim 13, wherein all of the received identifying information is normalized.

22. A denied party identification system comprising:
a proposed trading party monitor module in a computer system in communication with an enterprise resource planning system;
a party identification normalizer in the computer system that receives party identification information from the monitor module, converts it to a normalized format, and compares it to restricted party identification information that is in a normalized format; and
a party match generator in the computer system that notifies the enterprise resource planning system if the party identification information matches any restricted party identification information,
wherein the party identification information includes data that identifies a party that wishes to conduct commercial trading activities,
wherein converting to a normalized format comprises transforming the party identification information in a manner similar to a manner in which the normalized identifiers corresponding to parties with whom trade should be restricted have been transformed, so as to make more likely a match between the received identifying information and the normalized identifiers corresponding to parties with whom trade should be restricted;
wherein the party match generator is programmed to determine whether the normalized format of the identification information matches normalized restricted party information that reflects parties to whom certain sales are not to be made.

23. The denied party identification system of claim 22, wherein the proposed trading party monitor comprises a plug-in module that resides on the same server as a part of the enterprise resource planning system.

24. The denied party identification system of claim 22, wherein the proposed trading party monitor module monitors workflow transactions of the enterprise resource planning system.

25. The denied party identification system of claim 24, wherein the proposed trading party monitor module obtains party name and address information from workflow transactions.

26. The denied party identification system of claim 22, wherein the party identification normalizer receives restricted party information and converts it to a the normalized format.

27. The denied party identification system of claim 22, wherein the monitor module provides party identification information to the party identification normalizer in real-time or near real-time.

28. The denied party identification system of claim 22, wherein the monitor module provides party identification information to the party identification normalizer in batch submissions.

29. A computer-implemented method of regulating trading activities, the method comprising:

monitoring transactions in computer-based enterprise resource planning system for party identifying information of a potential trading party;

comparing, with a computer system, an identifier corresponding to the party identifying information to one or more identifiers corresponding to parties with whom trade is restricted; and selectively restricting, at least in part with the computer system, trading with the potential trading party if the identifier corresponding to the party identifying information correlates with one of the identifiers corresponding to parties with whom trade is restricted wherein the party identification information includes data that identifies a party that wishes to conduct commercial trading activities, wherein, before comparing the identifier corresponding to the party identifying information to one or more identifiers corresponding to parties with whom trade is restricted comprises applying one or more transformation rules to text of the identifier and the one or more identifiers in order to increase the chances that the comparison will generate a match.

* * * * *